United States Patent

[11] 3,633,100

[72] Inventors: Melvin F. Heilweil, Poughkeepsie; Maurice T. McMahon, Jr., Wappingers Falls, both of N.Y.
[21] Appl. No.: 36,523
[22] Filed: May 12, 1970
[45] Patented: Jan. 4, 1972
[73] Assignee: International Business Machines Corporation, Armonk, N.Y.

[54] TESTING OF NONLINEAR CIRCUITS BY COMPARISON WITH A REFERENCE SIMULATION WITH MEANS TO ELIMINATE ERRORS CAUSED BY CRITICAL RACE CONDITIONS
41 Claims, 18 Drawing Figs.

[52] U.S. Cl. ................................................. 324/73
[51] Int. Cl. ............................................. G01r 15/12
[50] Field of Search ........................................... 324/73

[56] References Cited
UNITED STATES PATENTS
3,286,175  11/1966  Gerbier et al. ................. 324/73

Primary Examiner—Rudolph V. Rolinec
Assistant Examiner—R. J. Corcoran
Attorneys—Hanifin and Jancin and Julius B. Kraft ABSTRACT: A method and apparatus for testing complex nonlinear binary circuits by applying a bilevel signal pattern, particularly a random pattern, to both a plurality of inputs in the circuit being tested and to a corresponding plurality of inputs in a reference simulation of said circuit, and for comparing corresponding outputs from the circuit and the simulation.

The apparatus includes means for converting the signal pattern which is to be applied to the simulation to a three level signal pattern in which two levels represent the two levels in the bilevel pattern and the third level represents an indeterminate binary circuit state. The reference simulation is adapted to receive a three level pattern input and to provide a three level output. Means for applying the three level signal pattern to the reference simulation include means for applying a third level signal to a given simulation input during a change between first and second level signals being applied to said input. Sensing means determine which portion of the simulation output remains at the third level, particularly after a change between any of the first two levels at one or more of the simulation inputs; the existence of the third or indeterminate level indicates that the change produced race conditions critical to the portion of the output at the indeterminate level. Inhibiting means prevent that portion of the simulation output at the indeterminate level from being compared with the output of the circuit being tested. This presents an improper rejection of a good circuit because of "compare failure" caused by the critical race conditions.

PATENTED JAN 4 1972 3,633,100

INVENTORS
MELVIN F. HEILWEIL
MAURICE T. McMAHON, JR

BY
*J. B. Kraft*
ATTORNEY

| Bi LEVEL LOGIC A | THREE LEVEL LOGIC | |
|---|---|---|
| | a | a' |
| 0 | 1 | 1 |
| X | 1 | 0 |
| 1 | 0 | 0 |

FIG. 8

| Bi LEVEL INPUT PATTERN | | | THREE LEVEL INPUT PATTERN | | | | | | THREE LEVEL OUTPUT | | Bi LEVEL OUTPUT |
|---|---|---|---|---|---|---|---|---|---|---|---|
| A | B | C | a | a' | b | b' | c | c' | d | d' | D |
| 0 | 0 | 0 | 1 | 1 | 1 | 1 | 1 | 1 | 1 | 1 | 0 |
| 0 | X | 0 | 1 | 1 | 1 | 0 | 1 | 1 | 1 | 0 | X |
| 0 | 1 | 0 | 1 | 1 | 0 | 0 | 1 | 1 | 1 | 0 | X |

TESTING OF NONLINEAR CIRCUITS BY COMPARISON WITH A REFERENCE SIMULATION WITH MEANS TO ELIMINATE ERRORS CAUSED BY CRITICAL RACE CONDITIONS

BACKGROUND OF THE INVENTION

1.

Field of the Invention

The present invention relates to testing of circuits, particularly nonlinear circuits. More specifically, it relates to method and apparatus for testing highly complex nonlinear circuits of the type used in integrated circuits and particularly in large-scale integration. It involves testing systems in which multilevel, e.g., bilevel, electrical signal patterns are applied to input points in the circuit under test and to corresponding input points in a reference simulation of the circuit under test, and the corresponding resulting outputs in the circuit and the reference simulation are compared; a "failure to compare" on any portion of the output being indicative that the circuit under test is defective.

2.

Description of the Prior Art

Comparative testing of a circuit against a reference which may be either a good actual circuit, a hardware simulation of the circuit or a computerized simulation of the circuit has been utilized in testing of nonlinear circuits. The test signal pattern which is applied to both the nonlinear circuit under test and to the reference is a multilevel pattern, with each level corresponding to one level of the logic in the circuit being tested. Since most nonlinear circuits involve binary logic, a bilevel signal pattern is used in the comparative testing of such circuits.

The applied test pattern usually comprises a series of changing pattern increments, each increment being a plurality of parallel signals, each signal being at one of said two levels. The plurality of signals in each pattern increment is applied to a matching plurality of input points in the circuit under test and also applied to a plurality of inputs in the reference corresponding to the input points in the circuit under test. The outputs resulting from each applied pattern increment are taken at least one corresponding outpoint point in the circuit and the reference and compared; a "failure to compare" on any portion of the output is indicative of a defective circuit.

The comparative testing approach is considered to be a potentially effective approach to the testing of highly complex microminiature integrated circuits. Because of the minute size and high density of such complex integrated circuits, most of the circuitry and circuit elements are inaccessible to the physical contacts required in most testing techniques. Consequently, the comparative testing approach, based upon a sequence of test pattern increments applied to a relatively few input points in the circuit and in the reference, permits effective testing of the inaccessible internal circuitry between the input points and the output points. The test pattern applied may be a predetermined pattern having a sequence of varying pattern increments determined to be sufficient to test the internal circuitry.

However, a more effective approach appears to be a random or pseudo-random comparative testing system wherein a highly rapid sequence of randomly varying pattern increments is applied to a corresponding plurality of inputs in both the circuit under test and the reference at a rate in the order of thousands of different patterns per second. Statistically, such random pattern systems have been found to apply in the order of thousands of different pattern increments to the circuit being tested in a relatively short period of time. The philosophy of such random testing schemes appears to reside in testing through the elimination of defective circuits rather than in the unequivocal designation of defect-free circuits. The background and philosophy of random and pseudo-random comparative testing is set forth in copending application Ser. No. 825,870, entitled "Logic Test System," inventors G. R. Giedd et al., filed May 19, 1969, assigned to the assignee of the present application. A major problem which has been encountered in prior art comparative testing systems is that of critical race conditions produced in the circuit under test and/or in the reference circuit as a result of changes in the sequence of test pattern increments being applied. In sequential nonlinear circuits, a change between any two sequential pattern increments may produce race conditions in the circuit critical to one or more output points in the circuit and/or the reference. A sequential circuit is defined as one whose sequences of output are functionally dependent on the sequences of input conditions. A critical race condition will produce an eccentric output signal at one or more output points, i.e., the same input sequence may produce an output at a given output point at either of the logic levels, e.g., one or zero, in a binary circuit dependent solely on which input signal "wins the race."

Figure 1:
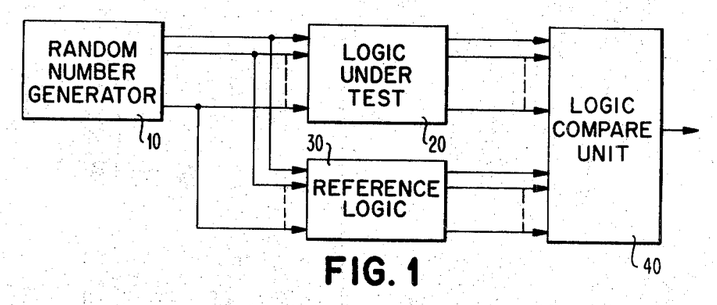
FIG. 1 is a generalized block diagram of the apparatus of copending application Ser. No. 825,870.
Figure 2:
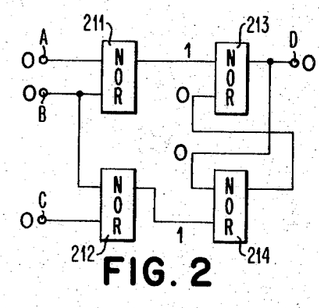
FIGS. 2, 2A and 2B are block logic diagrams of an illustrative, sequential, binary nonlinear circuit subject to critical race conditions resulting from an input pattern change, FIG. 2 showing the circuit with the original applied pattern and FIGS. 2A and 2B showing two possible circuit conditions resulting from the critical race conditions.
Figure 2A:
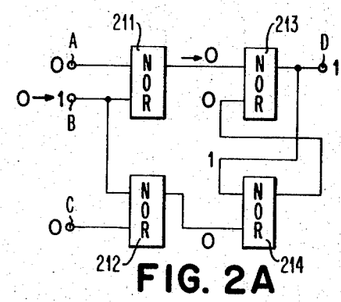
Figure 2B:
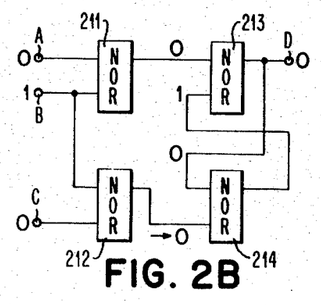

In order to better illustrate this problem, let us assume that the sequential circuit shown in FIG. 2 involving a combination of NOR gates is the circuit or logic under test 20 in the comparative test system shown in FIG. 1. The test system of FIG. 1 is the random pattern comparative system of copending application Ser. No. 825,870. Circuit or logic under test 20 and reference logic 30 are both connected to random number generator 10. Logic under test 20 and reference logic 30 are also connected to the logic compare unit 40. The random number generator 10 provides outputs to corresponding input points of logic under test 20 and reference logic 30. The increments in the test pattern are applied identically to the three inputs of logic 20 and the corresponding inputs of reference 30; the outputs of circuit or logic 20 are compared to those of reference 30 in compare unit 40 which senses "failure to compare" resulting in the rejection of the circuit being tested as a defective circuit. With reference to FIG. 2, let us assume that random pattern generator 10 has just applied a binary signal input of 0, 0, 0 respectively to inputs A, B, and C in the circuit being tested 20 and to corresponding inputs in reference 30. This has produced a binary signal output of 0 at output D. In the next sequential pattern increment of 0, 1, 0 applied to these inputs, as shown in FIG. 2A, the input at B changes from a 0 to a 1. This, in turn, changes the outputs from both NOR-gate 211 and NOR-gate 212 from 1 to 0. This results in a race condition as follows. If the 0 output from gate 211 reaches gate 213 before the 0 output from gate 212 reaches NOR-gate 214, a 1 is produced at circuit output D, as shown in FIG. 2A. On the other hand, if the 0 output from gate 212 "wins the race" and reaches NOR-gate 214 before the 0 output from gate 211 reaches gate 213, the circuit output D will be 0, as shown in FIG. 2B. Accordingly, the change in signal input pattern from 0,0,0 to 0,1,0 has produced a race condition critical to circuit output D. Should the eccentric output at D result in one binary level, e.g., 1, in the output of the circuit under test 20 and the opposite binary level at output D in reference logic 30, the compare unit 40 will produce a "failure to compare" resulting in the improper rejection of a defect-free circuit.

While the prior art test apparatus functions effectively in testing combinatorial circuits and sequential circuits free of possible critical race conditions, the testing of sequential circuits which may be subject to critical race conditions cannot be accomplished.

SUMMARY OF THE INVENTION

Accordingly, it is a primary object of the present invention to provide a comparative testing system which is free from errors caused by critical race conditions in the circuit being tested.

It is another object of the present invention to provide a comparative test system for testing sequential circuits.

It is an even further object of the present invention to provide a comparative test system capable of effectively testing both combinatorial and sequential integrated circuits.

It is yet another object of the present invention to provide a comparative test system based on a multilevel electrical signal pattern made up of a plurality of pattern increments for testing both combinatorial and sequential multilevel nonlinear circuits.

It is a further object of the present invention to provide a comparative test system for nonlinear binary logic circuits which has the capability of testing both combinatorial and sequence circuits.

It is yet a further object of the present invention to provide a random pattern comparative test system capable of testing both sequential and combinatorial nonlinear circuits having multilevel logic.

It is still another object of the present invention to provide a method, in comparative testing of nonlinear circuits, for rapidly and efficiently synchronizing the patterns applied to the circuit being tested and to the reference simulation, and for synchronizing the logic levels in both the circuit and the simulation.

The present invention provides an improvement in apparatus for testing nonlinear circuits having multilevel logic, e.g., binary logic, in which a common multilevel signal pattern is applied both to a plurality of input points in the circuit being tested and a corresponding plurality of input points in a reference simulation of the circuit, and the resulting outputs from the circuit and the simulation are compared. The improvement comprises means for converting the multilevel or $n$-level signal pattern into an $(n+1)$-level signal pattern; in tee latter pattern, the $n$ levels represent the $n$ levels in the original signal pattern and the additional one level represents an indeterminate level in the circuit logic.

The $n+1$ signal pattern is applied to a reference simulation which is adapted to receive the $(n+1)$ signal pattern at at least one and, preferably, a plurality of input points corresponding to the input points in the circuit under test. The reference simulation is further adapted to provide an $(n+1)$-level output which may indicate a definitive logic level (one of the $n$ levels) and/or an indeterminate level represented by the additional level. Thus, the original $n$-level, e.g., bilevel, signal pattern is applied to a plurality of input points in the circuit being tested at the same time that the converted $(n+1)$ level, e.g., three level, pattern is applied to corresponding input points in the reference simulation.

Prior to comparison with the output of the circuit being tested, the output of the reference simulation is sensed for the presence of the level, e.g., third level, representing an indeterminate logic level. Means convert the three-level simulation output back to a two-level output, and this two-level output is compared with the corresponding two-level output in the circuit being tested. However, if an indeterminate logic level has been sensed for any portion of the simulation output, that portion of the simulation output is prevented from causing an improper rejection of the circuit under test because of a "failure to compare." This is preferably accomplished by means for inhibiting the comparison of any portion of the simulation output at the indeterminate level with the corresponding portion of the output of the circuit being tested.

It will be understood that the principles of this invention apply not only to the testing of binary nonlinear circuits but equally to the testing of other multilevel circuits such as ternary circuits. However, for convenience in the present specification, we will explain our invention primarily in terms of binary circuits.

By utilizing a three-level reference circuit simulation, two levels of which represent the standard binary circuit levels and the third level represents an indeterminate state or level in the binary circuit, we are able to provide an indication of the indeterminate or eccentric state usually resulting from critical race conditions rather than to force this indeterminate level to assume one of the binary levels, a level which it cannot consistently assume. In order to insure that the indeterminate signal level resulting from critical race conditions will remain in the affected portion of the simulation output, means for applying the three level signal pattern to the simulation are provided which permit the application of the third or indeterminate level signal to a simulation input during any change between the first and second level signals being applied to said input.

Figure 3:
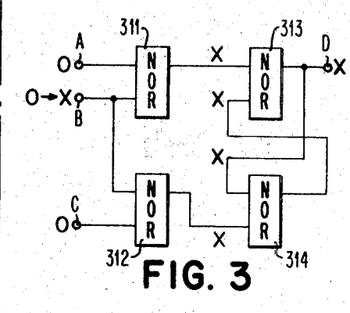
FIGS. 3 and 3A are block logic diagrams of a three level reference simulation of the circuit of FIG. 2, showing the effects on the simulation of the pattern change indicated in FIG. 2.
Figure 3A:
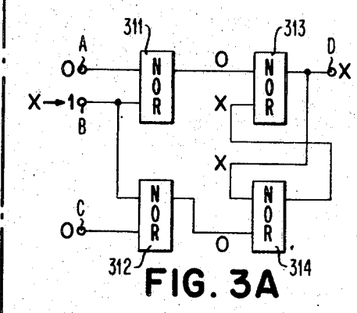

In order to better understand this aspect of the invention, the three-level simulation shown in FIGS. 3 and 3A will be considered briefly at this point. A more detailed description will follow in the description of the preferred embodiments. FIG. 3 represents the three-level reference simulation of the circuit of FIG. 2. Let us assume that, as in FIG. 2, input B in FIG. 3 is to be changed from a 0 to a 1. Input B is first passed through the third or indeterminate level represented by X. Three level NOR-gates 311, 312, 313, and 314, each of which operates as shown in the truth table in FIG. 13, assume the inputs and outputs shown in FIG. 3 when the X level is applied to input B. As a result, output D is at the X or indeterminate level. Then, when the change in input B continues from X to 1, the NOR-gates assume the input and output values shown in FIG. 3A with output D still remaining at the indeterminate level X. The fact that output D remains at the indeterminate level when the change from 0 to 1 at input B is completed, indicates that during the sequential change from the pattern increment of 0,0,0 at inputs A, B, C to the pattern increment of 0,1,0 at said gates, race conditions critical to output D occur.

The indeterminate level at output D is then sensed by the sensing means, and a comparison involving output D may be inhibited to prevent the improper "failure to compare" and consequent rejection of the circuit. If the circuit shown in FIG. 3 is only a portion of the circuit being tested, there may be outputs other than D which are at one of the binary levels; such outputs will be compared with corresponding outputs from the circuit being tested. The next increment in the sequential pattern applied may be such that output D will assume a 1 or 0 level; then, output D will once again be available for comparison.

In accordance with another aspect of the present invention, a method is provided for use in comparative testing of nonlinear circuits by which the patterns applied to the circuit and to the reference simulation may be rapidly synchronized and the logic levels in both the circuit and the simulation may also be synchronized. This method involves applying an initial pattern increment, comprising a plurality of signals in the bilevel form, to a plurality of inputs in the circuit under test and the same pattern increment in the three level form to the three-level reference simulation. Then, a next subsequent pattern increment, in which each of the signals is at a changed logic level from the coincident signal in the initial pattern, is applied in the two-level form to the inputs in the circuit being tested and in the three-level form to the reference simulation. Because the sequence of application of the three-level signal to the reference is such that when a given input signal is being changed from a first to a second of the two logic levels, the third level representing the indeterminate logic level is applied to the input during the change, all of the inputs in the simulation will thus be passed through the indeterminate level. We have found that such a passage of all of the inputs in the simulation through the indeterminate level has the effect of synchronizing the signal patterns applied to the circuit and simulation and synchronizing the logic levels in the circuit and simulation. This method applied to both combinatorial circuits and sequential circuits regardless of whether critical race conditions exist. The test system of the present invention, therefore, has this additional advantage which is significant to comparative testing of both combinatorial and sequential circuits.

The foregoing and other objects, features and advantages of the invention will be apparent from the following more particular description and preferred embodiments of the invention as illustrated in the accompanying drawings.

DESCRIPTION OF THE PREFERRED EMBODIMENTS

General Description

In order to best illustrate the embodiments of the present invention, they will be illustrated in combination with the apparatus of copending application Ser. No. 825,870, directed to a random pattern comparative test system. For convenience, the nonlinear circuits being tested will be described as binary logic circuits and the reference simulation will accordingly be in three-level logic. However, it will be clear that the present invention is equally applicable to the other multilevel nonlinear circuits. For a general description of the combination of apparatus utilized in the present invention, reference is made to FIG. 4.

Figure 4:
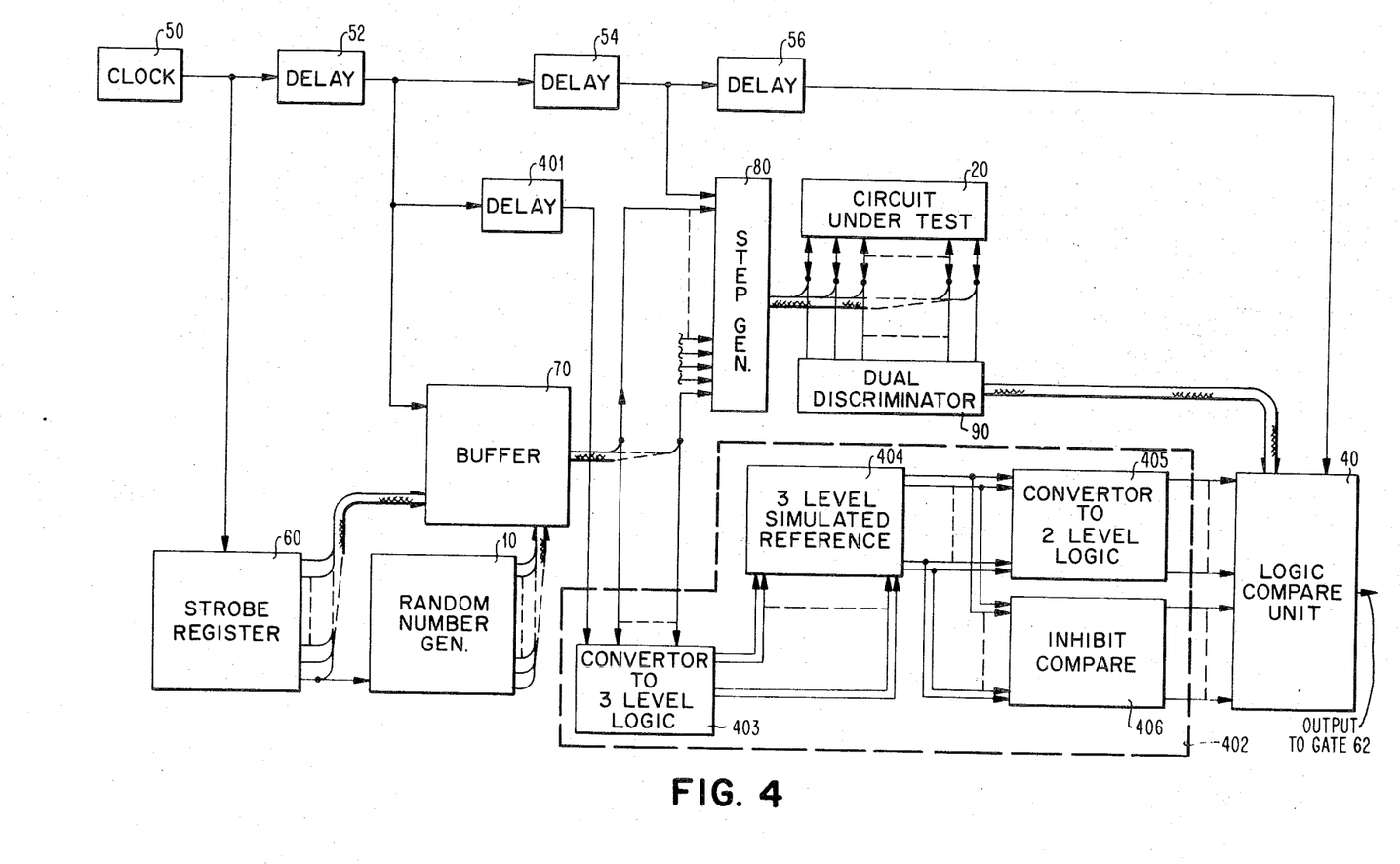
FIG. 4 is a general block diagram of the apparatus of the present invention.

Clock 50 is a pulse generator of standard construction and provides timing pulses to the system directly to strobe register 60 and also through appropriate delay circuits 52, 54, 56, and 401. The output of strobe register 60 is connected to random number generator 10 and buffer 70. It is the purpose of strobe register 60, random number generator 10 and buffer 70 to provide an appropriate random test pattern. Assuming for purposes of example that a circuit to be tested has 48 connecting pins as inputs, then random number generator 10 will have an equal number, i.e., 48 outputs. In the same example which will be used throughout this specification, strobe register 60 has 49 outputs, one of these outputs applying a signal to random number generator 10; the other 48 outputs being connected to buffer 70.

Buffer 70 receives 48 inputs from strobe register 60, 48 inputs from random number generator 10 and a timing signal from delay circuit 52. As an output, buffer 70 provides the same number of outputs, i.e., 48, to step generator 80 and reference system 402.

Step generator 80 accepts the 48 signals from buffer 70 and in response to a timing pulse from delay circuit 54, simultaneously supplies these 48 input signals to circuit under test 20. Step generator 80 provides timing and pulse shaping, particularly for supplying fast rise-time pulses at proper voltage levels to circuit under test 20.

For convenience in description, we will assume that the output pins of circuit under test 20 are the outputs to be compared. These output pins are connected to dual discriminator 90 which determines the voltage level of such pins in response to signals from generator 80. Dual discriminator 90 then provides binary signals to compare unit 40 for comparison with a corresponding output from reference system 402. Logic compare unit 40 receives the outputs from dual discriminator 90 and reference system 402 and compares corresponding signals. When a mismatch occurs, an error signal is provided in response to a timing pulse from delay circuit 56. Such an error signal can be connected to stop the output of clock 50, thereby stopping the test. The delay circuit is a relatively long delay so that the signals from both reference system 402 and dual discriminator 90 are present at the inputs of the logic compare unit 40 before a timing pulse from delay circuit 56 causes a comparison to be made. Comparison reference system 402 comprises converter 403 which converts the binary input signal pattern from buffer 70 to a three-level signal pattern. This three level signal pattern is applied to simulated reference 404 which is a three level simulated reference of the circuit under test 20. As will be described hereinafter in greater detail, when any input from buffer 70 to reference system 402 in a given sequential pattern increment is being changed from the coincident input in the previous pattern increment, the converter 403 provides an intermediate third level signal at the corresponding input point to the three level simulated reference 404. This third level signal represents the indeterminate circuit state. Accordingly, any change between the 0 and 1 level in succeeding increments in a sequential test pattern generated from buffer 70 will cause the X or indeterminate level to be applied to the input point in simulated reference 404 undergoing this change before the application of the new level. If the change in such successive pattern increments is of the type that will produce race conditions critical to any of the output points in simulated reference 404, these output points will remain at the X or indeterminate level even after the new level has been applied to the input in simulated reference system 404. The output signals from the simulated reference system 404 are fed to a converter means 405 and to inhibit compare means 406. Converter means 405 convert the three-level simulated reference output back to a binary signal pattern which is, in turn, applied to logic compare unit 40 for comparison with a corresponding output from dual discriminator 90 representative of the circuit under test. Means 406 inhibit the comparison by logic compare unit 40 of any of the outputs from simulated reference 404 which remain at the X or indeterminate level. In this manner, eccentric or indeterminate outputs resulting from critical race conditions produced by a given sequence of pattern increments are inhibited from being compared. Thus, such eccentric outputs cannot cause the compare unit to improperly reject a circuit under test because of a failure to compare. The comparison of the output points at indeterminate levels in merely inhibited until a succeeding sequence of applied test pattern increments will produce an output at such points which is at a binary 1 or 0 level instead of the indeterminate level. Of course, such a succeeding sequence may result in indeterminate levels at other output points in the simulated reference system 404, in which case, the comparison of such other indeterminate output points will be inhibited until a succeeding sequence of pattern increments brings such points to definitive binary levels.

Detailed Description

The individual elements in the general test system described with respect to FIG. 4 will now be specifically described in detail. For consistency, where the individual elements are similar to equivalent elements in copending application Ser. No. 825,870, such elements will be described using the terms of the copending application. The details of elements already described in said copending application will be curtailed where such details are not necessary for the full understanding of the present invention.

Strobe Register, Random Number Generator and Buffer

Figure 5:
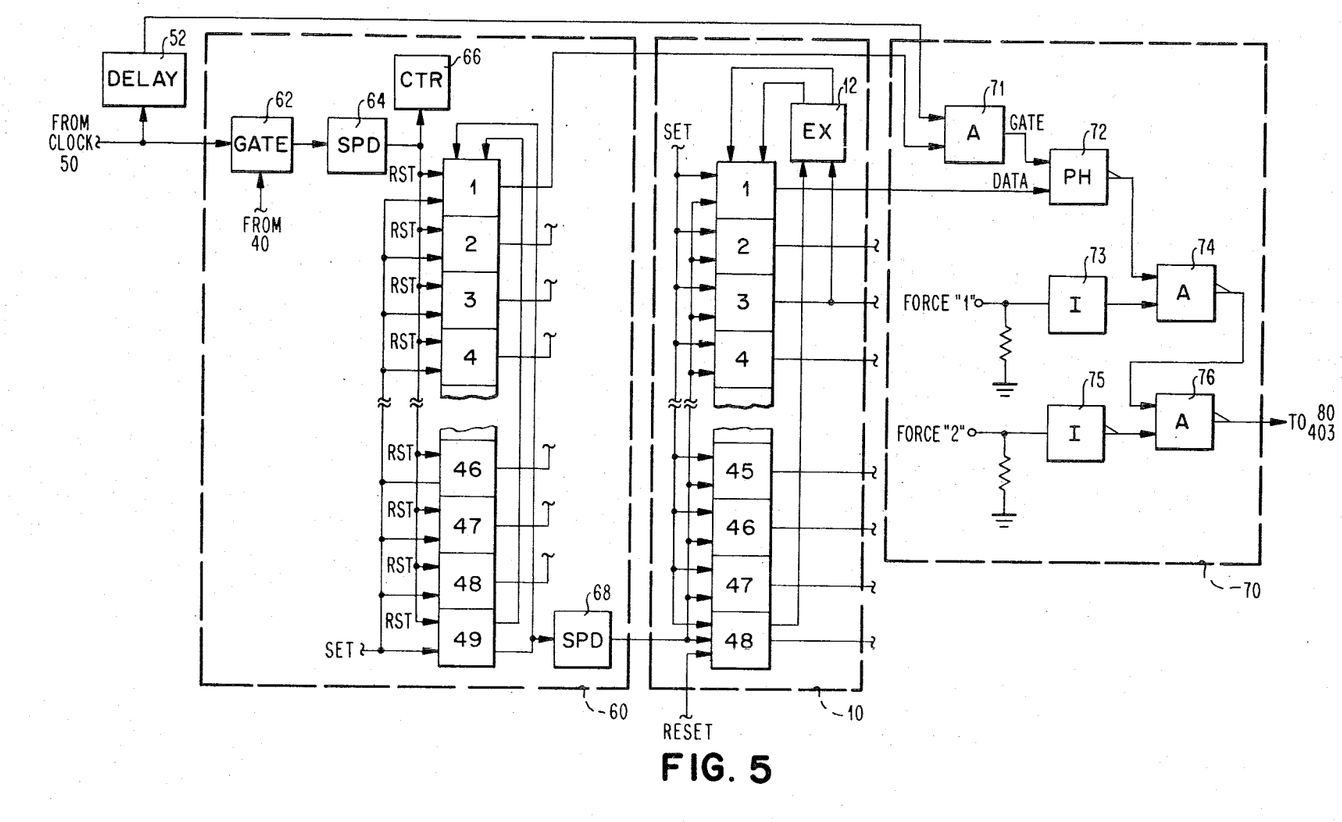
FIG. 5 is a more detailed block diagram of a portion of the apparatus of FIG. 4 particularly directed to the random number generator, the strobe generator, and a portion of the buffer.

FIG. 5 is a more detailed diagram of strobe register 60, random number generator 10, and a portion of buffer 70. Strobe register 60 primarily includes a shift register having 49 stages, one more than the number of pins to be tested. The shift register receives a SET input pulse whereby initial conditions are set such that zeros are inserted into the first 48 stages and a 1 is inserted into the 49th stage. The shift register also receives shift pulses from clock 50 through gate 62 and sample pulse driver 64. The second input to gate 62 is connected to the output of unit compare logic 40. Sample pulse driver 64 merely provides a power drive for the signal from gate 62 so that an input can be provided to all 49 stages of the shift register as well as counter 66. Counter 66 is of conventional construction and provides an indication of the number of tests performed. The 49th stage of the shift register is connected to the first stage so that the 1 initially inserted will be progressively shifted through the register. The 49th stage output is also connected to sample pulse driver 68 which supplies a drive pulse to the random number generator 10. The other 48 outputs of the shift register of strobe register 60 are connected to buffer 70. The second output of the 49th stage is merely an inverted output and is connected to the first stage for conventional operation of the shift register.

With continued reference to FIG. 5, it is seen that random number generator 10 comprises a 48-stage shift register and an exclusive-OR circuit 12. It is possible to set any starting pattern into the shift register through the SET and RESET lines. Each of the 48 stages receives an input from sample pulse driver 68 which provides the shift pulse. Each of the 48 outputs of random number generator 10 is connected to the buffer 70. Random number generator 10 also comprises exclusive-OR circuit 12 which has its inputs connected to the third and 48th stages of the shift register and its outputs (in phase and out of phase) connected to the first stage.

With continued reference to FIG. 5, our invention will be described in still greater detail. In order to facilitate understanding and avoid duplication, the system will be described with respect to a single pin to be tested. FIG. 5 therefore shows a portion of buffer 70. The portion of buffer 70 shown is the circuit for the output of the first stage of strobe register 60 and the first stage of random number generator 10. In the system, there are 48 such circuits, each of them identical to the one shown and connected to one of the stages of each of the shift registers as shown for the first stage in FIG. 5.

As shown in FIG. 5, buffer 70 comprises an AND-circuit 71 which receives an input from strobe register 60 and delay circuit 52. Polarity hold (PH) circuit 72 receives the output of AND-circuit 71 and random number generator 10. PH circuit 72 comprises a gate and a latch. The output of AND-circuit 71 provides the gating signal which enters the polarity of the signal from random number generator 10 into the latch. This resultant output of PH-circuit 72 is held until a new signal is gated in by a gating signal from AND-circuit 71. The slash mark at the output of the PH-circuit 72 indicates merely that it is the inverted output which is applied to AND-circuit 74. Gates 73 through 76 and the "FORCE 1" and "FORCE 0" inputs of buffer 70 form part of a switching means in the buffer, whereby fixed signals may be applied to selected input pins. The function of these switching means, which are described in detail in copending application Ser. No. 825,870, are not necessary to the understanding of the present invention.

For the purpose of the present invention, we are assuming that the input pattern generated in he random number generator 10 is being applied to only input pins in an integrated circuit under test, and that the output from the circuit under test to be compared is taken from a plurality of output pins in the integrated circuit. Random number generator 10 is therefore considered to be generating a random test pattern consisting of a sequence of changing pattern increments, each pattern increment comprising 48 parallel signals corresponding to the stages in the 48-stage shift register. Thus, each pattern increment, or a portion thereof, may be applied to a circuit under test which may have up to 48 input points. If the "FORCE 1" and "FORCE 0" inputs in each of the 48 buffer units are maintained at the no signal or 0 level, then the binary data in each of the 48 stages in the random number generator shift register will be output from gate 76 at the same signal as the data in the corresponding stage of the shift register. In other words, a 1 in stage 1 of the shift register will emerge from its corresponding buffer unit at gate 76 as a 1. Each 48 bilevel signal pattern increment, or an appropriate portion thereof, is applied to a plurality of inputs (up to 48 ) in the circuit under test 20 via step generator 80, and also to a plurality of corresponding inputs in three level simulated reference 404 via converter 403.

The random pattern may be either totally random, i.e., each of the sequential 48 signal pattern increments is fully independent of its preceding or succeeding increment, or a pseudo-random pattern.

The pseudo-random pattern actually used for testing is obtained by the interaction of random number generator 10 as well as strobe generator 60 and buffer 70. Refer to FIG. 5 for a description of the beginning of a test cycle. Before testing begins, the 49th register of strobe register 60 has a 1 set therein and the other 48 states are reset to 0. The 48 stages of random generator 10 are set to any desired pattern of 1's or 0's. After these initial conditions are set, the input to gate 62 is raised to an up level permitting clock pulses to pass through sample pulse driver 64. The first of these clock pulses brings the count in counter 66 to 1. It also shifts the shift register in strobe generator 60 so that the 1 previously in the 49th stage is inserted into the first stage, stages two through 49 containing 0's. At this time, random number generator 10 has received no new inputs and therefore maintains the initially inserted pattern. Note that at every 49th clock pulse, the shift register in random number generator 10 is shifted by one in response to a signal through sample pulse driver 68. Note also that whenever the third stage and 48th stage of the shift register in random number generator 10 contain the same number, exclusive-OR circuit 12 inserts a 1 into the first stage. When the third and 48 th stages have unlike numbers, exclusive-OR circuit 12 inserts a 0 into the first stage. Thus, for example, if the third and 48th stage each contain a 0, then the output of exclusive-OR circuit 12 will insert a 1 into the first stage. The same is true if both the third and 48th stage each contain a 1. However, if either the third stage or the 48th stage contains a 0 and the other of the two stages contains a 1, then the output of exclusive-OR circuit 12 is a 0 which is then inserted into the first stage of the shift register. The resulting 48 signal pattern is applied to buffer 70 and then to the circuit being tested and the reference system in the manner described previously.

Step Generator and Dual Discriminator

Figure 10:
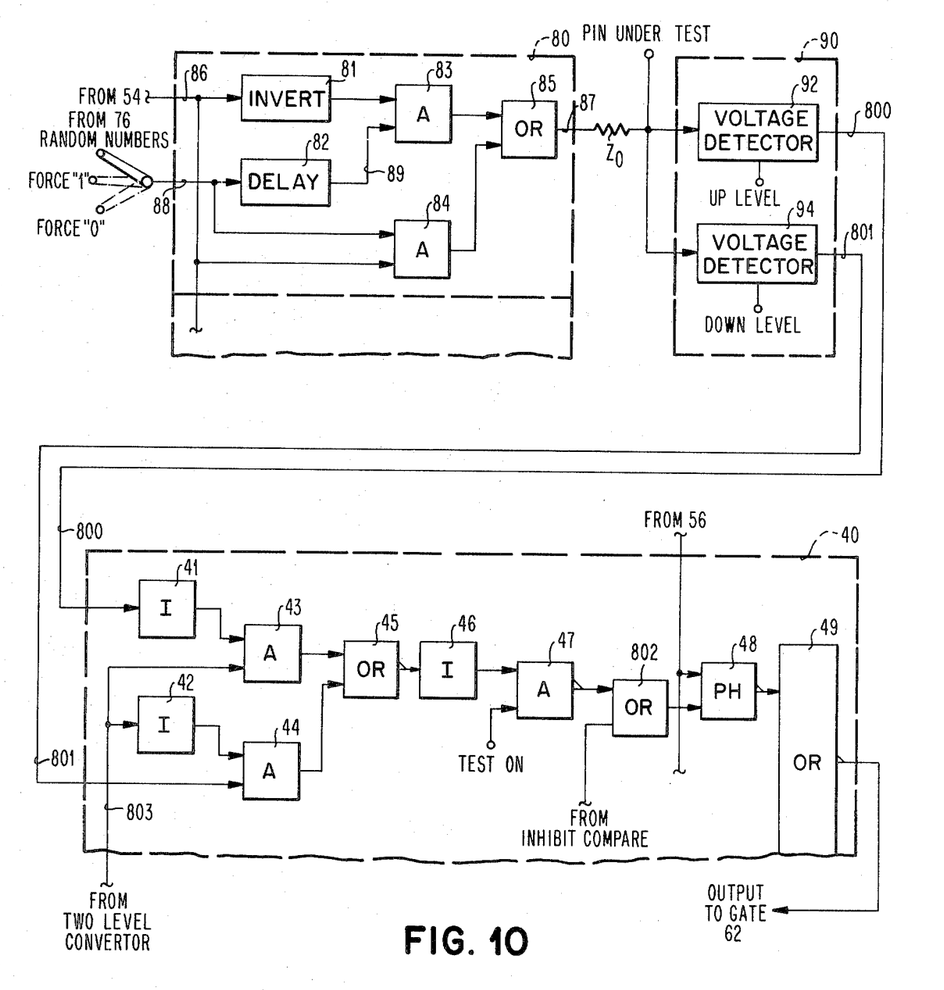
FIG. 10 is a more detailed block diagram of a portion of the apparatus shown in FIG. 4 particularly directed to the step generator, the dual discriminator and the logic compare unit.

These elements operate substantially in the manner described in copending application Ser. No. 825,870. With reference to FIG. 10, one unit of the step generator 80 and one unit of the dual discriminator 90 are shown in connection with one pin in the circuit under test which is designated as "pin under test." It should be understood that, for convenience, there is one of each of these two units for each pin, both input and output pins, in the circuit under test. This permits each terminal or pin in the circuit under test to be treated as either an input pin or an output pin, thus giving the test apparatus flexibility in testing different circuits. The characteristics of the circuit being tested will be considered in determining which pins should be inputs and which should be outputs for the most efficient testing of the circuit. The test pattern is applied to the input pins through step generator 80 and the resulting output is taken from the output pins through dual discriminator 90.

Step generator 80 comprises invert circuit 81, delay circuit 82, AND-circuits 83 and 84, and OR-circuit 85. Invert circuit 81 receives a timing pulse from delay circuit 54, and delay circuit 82 receives data signals from gate 76 of buffer 70. Since we have assumed that there is no input at "FORCE 1" or "FORCE 0," the switching of the input to delay 82 to these two points will not be considered and input 88 will be considered to come directly from gate 76.

Figure 11:
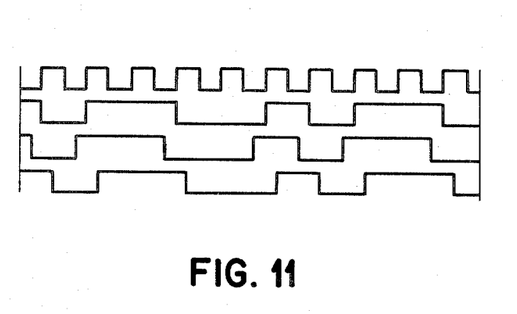
FIG. 11 is a waveform diagram showing the operation of the step generator.

Refer now to FIGS. 10 and 11. FIG. 11 is a timing chart of the various waveforms in the circuit. Step generator 80 is a circuit which will provide at its output digital information which is the same as the pattern of digital information applied to its input line 88. However, this pattern will by synchronized to either the positive or negative transitions of the clock signal from delay circuit 54. The transitions at the generator output are independent of the transition time of the input data. The timing pulse input from delay circuit 54 is inserted into invert circuit 81 and AND-circuit 84. The inverted data signal from AND-circuit 76 of buffer 70 is inserted into delay circuit 82 and AND- circuit 84. Therefore, an output at either AND-circuit 83 or AND-circuit 84 will produce an output at OR-circuit 85. In this way, an up level output will be present on line 87 when either an up level data signal on line 88 coincides with an up level clock pulse on line 86 or a delayed up level data signal on line 89 coincides with a down level clock pulse on line 86. The output pulse on line 87 derived in the manner just described supplies a desired test pulse to the pin under test through characteristic impedance $Z_0$.

The output of OR-circuit 85 is the properly shaped and timed test signal which is supplied to the input pin under test with appropriate impedance matching through the characteristic impedance $Z_0$. Where the pin under test is an output pin, there is no input to the pin through the step generator and a proper terminating impedance may be applied through characteristic impedance $Z_0$ or in the manner described in copending application Ser. No. 825,870.

Figure 12:
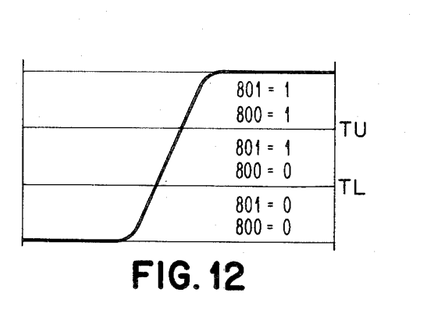
FIG. 12 is a waveform showing the operation of the dual discriminator.

The response of each output pin is detected by dual discriminator 90. With continued reference to FIG. 10, its operation will be described. As shown, dual discriminator 90 comprises voltage detector 92 and voltage detector 94, each of them receiving an input from the output pin. Each voltage detector also receives a reference voltage. Voltage detector 92 receives an upper level reference voltage, while voltage detector 94 receives a lower level reference voltage. Voltage detector 92 will provide a binary 1 on output line 800 when the signal from the output pin exceeds the upper level reference voltage. Voltage detector 94 will have an output on output line 801 when the input from the pin under test is greater than the reference lower level. FIG. 12 is a waveform showing the condition needed for outputs needed on lines 801 and 800. When the lower threshold TL is not exceeded, both lines are at 0. When the lower threshold is exceeded, there is a 1 output on line 801 but line 800 remains at 0. When the upper threshold TU is exceeded, both lines are brought to a 1 level.

When the circuit output pin has a 1 output, the upper threshold is exceeded and lines 801, and 800 are both at the 1 level. When the output pin has a 0 output, the lower threshold is not exceeded and lines 801, and 800 are both at the 0 level. When the circuit being tested does not produce an output at its output pins either above the upper threshold or below the lower threshold, the circuit is defective. A 1 on line 801, and a 0 on line 800 is indicative of such a defective circuit condition. The compare unit will reject such a defective circuit without even comparing the output with the output from reference system 402, as will be hereinafter specifically described with respect to the compare unit. The signals on lines 801, and 800 are the input to AND-circuit 44 and invert circuit 41 of unit compare logic 40.

The output from the circuit under test is thus applied via the dual discriminator to the logic compare unit. There will now be described how the bilevel signal pattern is applied to the reference system 402, the operation of the reference system and the application of a corresponding output from the reference system to the logic compare unit.

Reference System

Figure 6:
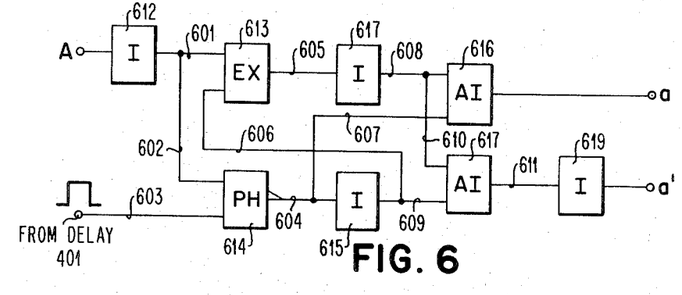
FIG. 6 is a more detailed block diagram of a portion of the apparatus shown in FIG. 4 particularly directed to the converter to three level logic which converts from single to double-rail logic.

Each of the 48 bilevel pattern increments, or an appropriate portion thereof, is applied to converter 403 in reference system 402. The three-level logic utilized in reference system 402 is formed in double-rail logic, that is, each of the bilevel values is represented by a double-rail or double-bit value, and the indeterminate bilevel value is also represented by a double-rail value. A convenient double-rail representation for three-level logic is shown in the table in FIG. 8. The 0 bilevel value is represented by 11, the 1 bilevel value is represented by 00, and the indeterminate or X bilevel value is represented by 10. Each of the parallel bilevel input signals in a given pattern increment to reference system 402 must be converted by converter 403 to its representative three-level value. The conversion circuit shown in FIG. 6 provides a convenient means for achieving the conversion shown in FIG. 8. Converter 403 contains one conversion circuit for each signal input. Accordingly, if the input pattern can comprise up to 48 signals, converter 403 contains up to 48 of the circuit units shown in FIG. 6.

Figure 8:
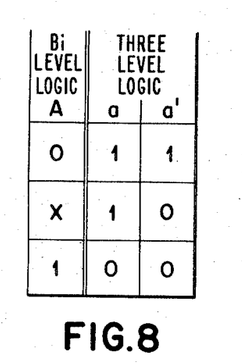
FIG. 8 is a conversion table from the single- to the double-rail logic as converted by the apparatus of FIG. 6.

Let us consider how the circuit in FIG. 6 operates to convert a single signal from a binary level to the three-level logic of FIG. 8. The "single-rail" bilevel input will be designated A and applied to input A, and the "double-rail" output be designated as $aa'$ and will be taken from outputs $aa'$. In order for reference system 402 to have the capability of detecting the presence of race conditions critical to one or more of the circuit outputs, the converter circuit of FIG. 6 should function in such a manner such that when the input at A is changed from one binary level to another, circuit output $aa'$, during the change from one of the binary levels to the other, assumes the indeterminate level before it assumes the new binary level. For example, if input A is being changed from 0 to 1, output $aa'$, which is changing from 11, the double-rail representation of 0, assumes the 10 level before it finally assumes the 00 level representative of the binary 1. Since each double-rail output $aa'$ is applied to three-level simulated reference 404, a change in any input to simulated reference 404 in succeeding pattern increments will result in the indeterminate level being applied to said input before the new level is applied. This provides a simulation input previously described generally with respect to FIGS. 3 and 3A. As will be hereinafter described in detail with respect to the operation of three level simulated reference 404, such a sequence at an input point being changed is necessary in order that the three level simulated reference may function to detect critical race conditions.

Considering now in detail the functioning of a converter circuit, as shown in FIG. 6, the bilevel signal applied at A is inverted by inverter 612 and applied via line 601 to exclusive-OR gate 613 and also applied via line 602 to polarity hold (PH) circuit 614. PH circuit 614 is conventional in construction and comprises a gate and a latch. A gating signal from delay 401, applied via line 603, will enter the polarity of the signal applied on line 602 into the latch. This signal will remain in the latch and provide the output of PH circuit 614 until a new signal is gated into the latch by a new gating signal at line 603. The output of PH circuit 614 is inverted as indicated by the slash mark, and applied via line 604 to inverter 615 and via line 607 to inverted AND-gate 616. The output of inverter 615 is applied via line 609 to inverted AND-gate 617 and via line 606 to exclusive-OR gate 613. The output of exclusive-OR gate 613 is applied via line 605 to inverter 617 where it is inverted and then applied both as the other input to gate 616, via line 608, and the other input to gate 617, via line 610. The output of inverted AND-gate 616 is the output in the double rail and the output of inverted AND-gate 617 is, in turn, inverted through inverter 619 to provide the other or $a'$ double-rail output.

The conversion circuit of FIG. 6 will convert the bilevel logic input A into the double-rail output $aa'$ in accordance with the table in FIG. 8 and any change in sequential inputs to A will pass through the indeterminate or X level. For example, let us assume that the input at A is to undergo a change in binary levels from 0 to 1. The change would proceed as follows: first, input A would be changed from a 0 to a 1 level, then a gating pulse from delay 401 would be applied to PH-circuit 614 via input 603. Going through this sequence, when input A is initially at 0, line 602 is at 1, the latch of polarity hold 16 is also at 1, line 604 is at 0. Consequently, line 606 is at 1. With this arrangement, the inputs to exclusive-OR gate 613 would be 1 on line 601 and 1 on line 606. This would result in an input to inverted AND-gate 616 of 1 on line 608 and 0 on line 607, yielding an a rail value of 1. Also the input to inverted AND-gate 617 would be 1 on line 610 and 1 on line 609, with a resultant level of 0 on line 611 which is inverted by inverter 619 to an $a'$ rail value of 1. The double-rail converted output representing a 0 input would be 11.

Now, when changing input A to 1, a 1 is first applied to input A. There is no gating pulse applied on line 603 to PH-circuit 614 at this point in time. Accordingly, while line 602 would now be at 0, the 0 level would not as yet have been gated into the latch in PH-circuit 614 and, consequently, the output of PH-circuit 614 would still be at the 1 level. Thus, line 604 would still be at the level and line 606 would still be at the 1 level. The input to exclusive-OR gate 613 would be 0 on line 601 and 1 on line 606, yielding a 1 on line 605 which results in an input to inverted AND-gate 616 of 0 on line 608 and 0 on line 607, giving a value of 1 at rail $a$. The input to inverted AND-gate 617 would be 0 on line 610 and 1 on line 611, giving an output of 1 on line 611 which is inverted by inverter 619 to a 0 value at rail $a'$. Thus, we would have a double-rail output of 10 which represents the X or indeterminate level. Then, in the completion of the change from 0 to 1 with input A still at the 1 level, a gating pulse from delay 401 is applied to PH-circuit 614 via line 603. The 0 value on line 602 is fed into the latch of PH circuit 614, and the output from PH-circuit 614 changes to a 0, inverted to a 1 on line 604. Line 606 is, thus, changed to a 0. The input to exclusive-OR gate 613 is 0 on each line, giving an output on line 605 of 0. This results in an input to inverted AND-gate 616 of a 1 on line 608 and a 1 on line 607 resulting in an a rail value of 0. Also, there is an input to inverted AND-gate 617 of 1 on line 610 and 0 on line 609, resulting in a level of 1 on line 611 which is inverted by inverter 619 to 0 $a'$ rail value. Thus, the final $aa'$ double-rail value changes from 10, representing the indeterminate value, to a level of 00, representing the binary 1 level.

Three-Level Simulated Reference

The three-level simulated reference 404 is a simulation in three-level logic of the circuit being tested. Since the three-level logic produced by converter 403 is in the form of double-rail logic, the simulated reference 404 should be in the form of double-rail logic. We have previously shown, with respect to FIGS. 2 and 3, a circuit which is subject to critical race conditions. In order to illustrate how critical race conditions are handled by the reference system of the present invention, let us assume that the circuit in FIG. 2 is to be implemented in three-level logic, as shown in general in FIG. 3, in such a manner that where, as shown in FIG. 3, there are race conditions critical to the output at pin D, output pin D will remain at the indeterminate or X level upon the completion of the change in pattern increments which produced the critical race conditions.

Figure 7:
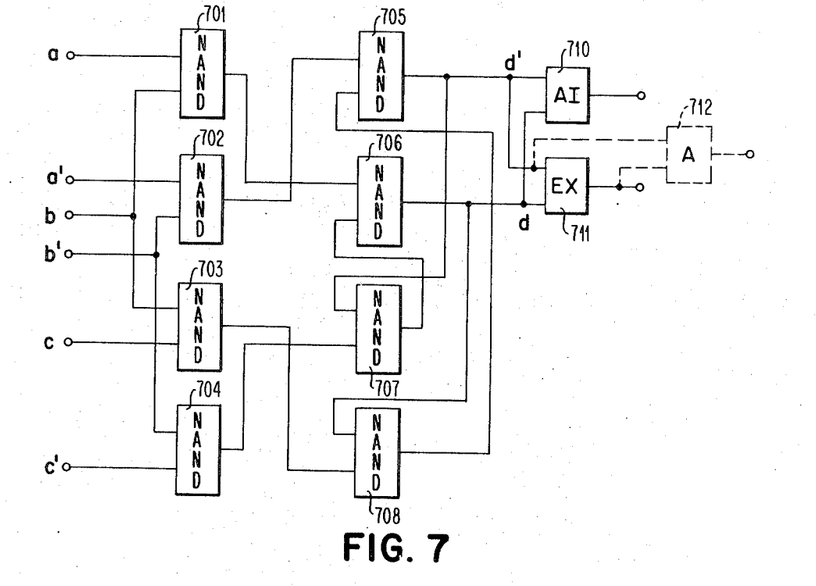
FIG. 7 is a more detailed block diagram of a portion of the apparatus shown in FIG. 4 particularly directed to the three-value simulated reference which operates on double-rail logic. This double rail simulated reference is a preferred embodiment of the three level simulation of FIG. 3.

If we then consider the circuit of FIG. 2 as being a portion of the circuit under test, inputs A, B and C may be considered as three of the input points to the simulated reference 404, and D may be considered as one of the output points from simulated reference 404. In FIG. 7, there is shown a three-level double-rail simulation of the circuit in FIG. 2. This double-rail simulation provides the desirable conditions of a three-level representation of said circuit as set forth in general with respect to FIG. 3.

The representation of binary logic by three-level logic, particularly in the form of double-rail logic, is set forth in the text *the Logic Design of Transistor Digital Computers*, G. E. Maley and J. Earle, 1963, at pages 283–288.

Since there is in three-level logic, in addition to the two levels representing the binary 1 and 0 levels, a third or indeterminate (X) level, a three-level simulation must be constructed in such a manner that it will provide a definitive 1 or 0 level, when the input to the circuit is such that a definitive output can be arrived at. On the other hand, when the input is insufficient to provide a definitive output, the output will be at the indeterminate or X level. Consequently, the output of a three level NOR gate should have the truth table shown in FIG. 13. For instance, with both inputs at the definitive or 0 level, the output of the NOR gate is a definitive 1. Likewise, when the two inputs to the NOR gate are at any combination of definitive 1 or 0 levels, the output of the NOR gate will be at a definitive level. On the other hand, if both inputs to the NOR gate are at indeterminate or X levels, the output from the NOR gate would clearly be at an indeterminate X level. However, when one of the inputs is at a definitive level and the other input is at an indeterminate level, there may or there may not be sufficient input data for the NOR gate to assume a definitive level. Thus, if one of the inputs is at the X level and the other input is at the 0 level, the output of the NOR gate cannot be determined because if the indeterminate level turns out to be a 1, then the NOR gate output will be 0 but, if the indeterminate level turns out to be a 0, the NOR gate output will be a 1. On the other hand, if one of the input gates is at the indeterminate level and the other is at the 1 level, the output of the NOR gate can be determined; irrespective of whether the indeterminate input coupled with the 1 input turns out to be a 0 or a 1, the NOR gate will still produce a 0.

Figure 13:
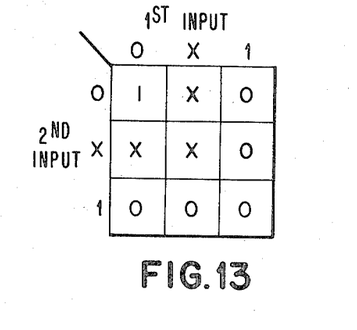
FIG. 13 is a truth table for the circuit of FIG. 3.

A three-level NOR gate having the truth table of FIG. 13 may be implemented in double-rail logic by a pair of NAND gates. Each rail of the double-rail input is respectively coupled to one of the double-rail NAND gates. We have in FIG. 7 the double-rail logic representation of the NOR circuit of FIG. 2 in which each of the four NOR gates is represented by a pair of NAND gates, i.e., bilevel input A represented by double rail $aa'$, a being applied to the NAND-gate 701 and $a'$ being applied to NAND'-gate 702. Paired NAND 701 and NAND'702 are the double-rail logic representation of NOR-gate 211 in FIG. 2. Likewise, NAND 703 and NAND'704 represent NOR 212, NAND 705 and NAND'706 represent NOR 213, and NAND 707 paired with NAND'708 represent NOR 214. Double-rail inputs $aa'$, $bb'$, $cc'$, in FIG. 7, are respectively the double-rail representations of inputs A, B, and C in FIG. 2. Output D in FIG. 2 is represented by double-rail output $dd'$ in FIG. 7. The paired NAND gates in FIG. 7 are interconnected in a manner corresponding to the NOR gates in FIG. 2. The interconnection of the NAND gates follows the principle that the output from a NAND gate is considered to be a prime output and connected to the input of a NAND' gate whenever an interconnection is appropriate. Likewise, the output of a NAND' gate is considered to be unprimed and coupled to the unprimed NAND gate where appropriate.

Figure 9:
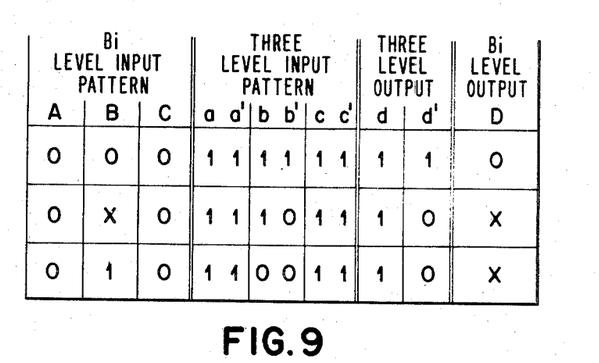
FIG. 9 is a table showing the double-rail input pattern to the three-level simulated reference of FIG. 7, the resulting double-rail output as well as bilevel translations of both the input and output during a bilevel pattern increment change from 0,0,0 to 0,1,0.

Considering now the operation of the reference simulation of FIG. 7 when the A,B,C pattern increment is undergoing a sequential change from 0,0,0 to 0,1,0, we have previously noted with respect to FIGS. 2–2B that such a change produces race conditions critical to the output at D. We have also noted with respect to FIGS. 3 and 3A that the three level simulation should provide an indeterminate or X level at output D, after the change is completed, to indicate the existence of race conditions critical to output D. The simulation of FIG. 7 will give these results. The table of FIG. 9 shows the double-rail input pattern to the circuit of FIG. 7 which corresponds to the pattern applied to FIG. 2 during a change from an A,B,C of 0,0,0 to 0,1,0. Since only B input is being changed, the A and C and the corresponding $aa'$ and $cc'$ double-rail inputs remain constant. The $bb'$ double-rail input undergoes a change from 11, representative of the 0 level, through 10, representative of the indeterminate or X level to 00, representative of the binary 1 level. During this transition, double-rail output $dd'$, which is at the 11 level representative of 0 when $bb'$ is at the initial 11 level, changes to 10, representative of the indeterminate state when $bb'$ changes to 10. However, when $bb'$ completes its change to 00, representative of 1, the $dd'$ output remains at the 10 or indeterminate binary level. The fact that output $dd'$ remains at the indeterminate level when the change at input $bb'$ is completed indicates that during the sequential change from the double pattern increment of 11, 11, 11, representative of the binary 0,0,0, to 11,00,11, representative of the binary 0,1,0, race conditions critical to output $dd'$ occur.

Converter Back Two Level Logic and Inhibit Compare Means

The conversion back to two-level logic and the sensing of the indeterminate level, in order to consequently inhibit the compare unit, are accomplished by applying each of the outputs of the simulated three-level reference 404, as represented by $dd'$ in FIG. 7, to both an inverted AND-gate 710 and to an exclusive-OR gate 711. Inverted AND-gate will convert a 11 double-rail output to a binary 0 and a 00 double-rail output to a binary 1. Exclusive-OR gate 711 will sense the presence of the indeterminate 10 level on output $dd'$ and will produce an inhibit pulse which will be applied to the logic compare unit in a manner to be hereinafter described with respect to FIG. 10. Since the double rail logic has an unused fourth level capability, as represented by 01, each fourth level may be used as an error check on the test system, i.e., the presence of the 01 level indicates that the apparatus may be in error. This level may be optionally sensed by applying an AND-gate 712, shown in phantom lines in FIG. 7, having one input from $d'$ and the other input from the output of exclusive-OR gate 711. The output of AND-gate 712 may be used to signal an error in the apparatus or to stop the apparatus in any conventional manner.

Where, as in the circuit of FIG. 7, a comparison involving a terminal is inhibited to prevent an improper "failure to compare" from the logic compare unit, other outputs resulting from the same pattern increment will be compared if they are at definitive binary levels and not indeterminate levels. The next increment in the sequential pattern being applied may be such that output D ($dd'$) will assume a definitive 1 or 0 level; then, output D will no longer be inhibited and will once again be available for the comparison.

Logic Compare Unit

Referring again to FIG. 10, it has been described how each of the outputs from the circuit under test is applied to compare unit 40 via lines 800 and 801 from dual discriminator 90.

The signals on lines 801 and 800 are the input respectively to AND-circuit 44 and invert circuit 41 of the logic compare unit 40. The corresponding output from the reference system on line 803 from converter gate 710 which is to be compared to the output from the circuit under test is applied to invert circuit 42 and AND-circuit 43. The unit shown in FIG. 10 represents one section of compare unit 40. There is one such section for every output from the circuit under test to be compared with a corresponding output from the reference system. AND-circuits 43 and 44 are connected to invert circuits 41 and 42 respectively. The outputs of AND-circuits 43 and 44 are connected to OR-circuit 45, the inverted output of which is the input to invert circuit 46. The output of invert circuit 46 is connected to the input of AND-circuit 47. The second input to AND-circuit 47 (Test On) is a gating signal which is brought up to an initial 1 condition when it is desired to test a given pin in the circuit. This provides an initial option of eliminating certain pins from the test procedure if desired. The inverted output of AND-circuit 47 is applied as one of the inputs to OR-circuit 802; the other input to OR-circuit 802 is from inhibit compare unit 406 and is actually the output of exclusive-OR gate 711. The output of OR-circuit 802 is supplied to polarity hold circuit 48. The inverted output of polarity hold circuit 48 is supplied as an input to OR- circuit 49. OR-circuit 49 also receives 47 other inputs from the other pins being similarly tested. Each of PH- circuits 48 supplies an output to OR-circuit 49 in response to a timing pulse from delay circuit 56, and this output is held at that polarity (either 0 or 1) until the next timing pulse is received from delay circuit 56. OR-circuit 49 provides an inverted output which is the output of unit compare logic 40. This output is connected to gate 62 in order to stop the test when an error is detected.

Let us now consider how each compare section operates. We have previously stated that a 1 on line 801 coupled with a 0 on line 800 from the dual discriminator is indicative, per se, of a defective circuit; the circuit output need not be compared and the circuit is to be rejected. The combination of a 0 on line 800 and a 1 on line 801 will result in a 1 being applied to each of AND-circuits 43 and 44. With both AND circuits so set, the circuit will be rejected without comparison irrespective of whether the binary input on 803 from converter gate 710 is a 1 or a 0, since a 1 signal will cause AND-circuit 43 to have a 1 output and a 0 signal will cause AND-circuit 44 to have a 1 output. With the circuitry shown, an output of 1 from OR-gate 45 will result in an input to OR-circuit 49 of 1, which will generate an output from OR-circuit 49 indicative of a defective circuit under test and will halt gate 62.

If, however, a signal on lines 800 and 801 either exceeds the upper threshold level or is less than the lower threshold level, then an error occurs only if this signal from the output pin in the circuit being tested does not match the signal from reference system at line 803. Therefore, if the output pin under test provides a 1, AND-circuit 44 will have one input set at 1. But, if reference signal 803 also provides a 1, the second input to AND-circuit 44 will be a 0 and no error output results. If, on the other hand, the pin under test provides a 0, AND-circuit 43 will have one input set at 1 through invert circuit 41. As long as the reference signal 803 also supplies a 0 to AND-circuit 43, no error output will be generated.

Assuming that an error condition exists so that either AND-circuit 43 or 44 has a 1 as an output, then the inverted output of circuit 45 will be a 0, and the output of invert circuit 46 will be a 1. The second input to AND-gate 47 is merely a signal which is brought up when the tester is run in a mode to detect errors. This would normally be the case so that the second input to AND-circuit 47 would normally be at a 1 level. Therefore, a 1 level output from invert circuit 46 will cause AND-circuit 47 to have an inverted output of 0. The 0 is then inserted into OR-circuit 802. If there is no "inhibit compare" signals on the other gate of OR-circuit 802 resulting from the sensing of an indeterminate output in the reference system, the output from OR-circuit 802 will still be a 0 which is inserted into the pulse hold circuit 48 which provides an output in response to a timing signal from delay signal 56. This inverted output will be a 1 whenever an error has been detected. The outputs of all 48 pulse hold circuits 48 are applied to OR-circuit 49 which provides a 0 output in response to a 1 input. This 0 or down level output is connected to gate 62 in strobe generator 60, blocking further clock pulses and stopping the test. Counter 66 indicates the number of tests performed prior to failure. Of course, as long as the system is running error free, or if failing pins are blocked at AND-circuit 47, the output of OR-circuit 49 is at 1 and gate 62 continues to pass clock pulses.

Considering now the case of an "inhibit compare" output from exclusive-OR gate 711, this is applied as a 1 to OR-gate 802 in the appropriate compare section. Thus, if we have a 0 being applied to OR-gate 802 as the inverted input from AND-circuit 47, a condition which will lead to a "reject circuit" signal from the compare unit, a 1 level on the "inhibit compare" input to OR-gate 802 will prevent gate 802 from passing a 0 signal, and thereby inhibit a "reject circuit" signal from OR-gate 49. In this manner, the "inhibit compare" signal from exclusive-OR gate 711, indicative of critical race conditions at a particular output, prevents a "failure to compare" of that output from causing the improper rejection of the circuit under test.

Alternative Embodiments for the Three-Level Reference System

Figure 15:
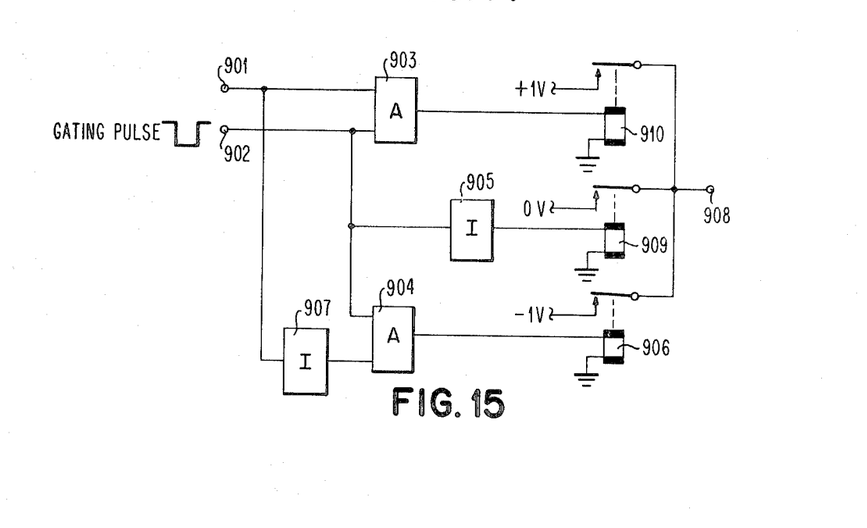
FIG. 15 is a circuit diagram of a converter to three voltage levels suitable for use in the three level simulation of FIGS. 3 and 14.

While the preferred embodiment of three-level reference system has been described in double-rail logic, the reference system may be implemented by other means, such as single inputs and outputs having a ternary or three-level signal. In such a reference system, each input is converted into three-level logic by a unit, as shown in FIG. 15. Let us consider the operation of the converter unit of FIG. 15 when a binary signal is being changed from a 0 to a 1. As previously indicated, the converter circuit must provide an intermediate X or indeterminate level signal during the transition. In the circuit shown, the binary 1 level is represented by 1 volt, the intermediate level is represented by 0 volts or ground, and the 0 level is represented by −1 volt. When the signal to be converted is a 0, input 901 is at the 0 level and gating pulse input 902 is at the up or 1 level. This renders gate 903 nonconductive and gate 904 conductive, since the 0 input has been inverted in inverter 907 before it is applied to gate 904. Accordingly, relay 906 is activated, connecting output 908 to the −1 -volt source indicative of the 0 binary level. Now, during the change to a binary 1 at input 901, a gating pulse which lowers the level of gate 902 to 0 is applied. This renders both gates 903 and 904 nonconductive. However, the 0 gating pulse is inverted by inverter 905 to a 1 level. As a result, relay 909 is now closed and 906 is open. This couples output 908 to the ground level which is indicative of an indeterminative output. The change to a binary 1 is completed by removing the gating pulse at input 902, while maintaining input 901 at the 1 level. Accordingly, only gate 903 produces a 1 output which closes relay 910, thereby connecting output 908 to the 1-volt source indicative of the 1 binary level. In this manner, the converter unit of FIG. 15 operates to provide a three-level input in which any change from one binary level to another passes through an indeterminate level.

Figure 14:
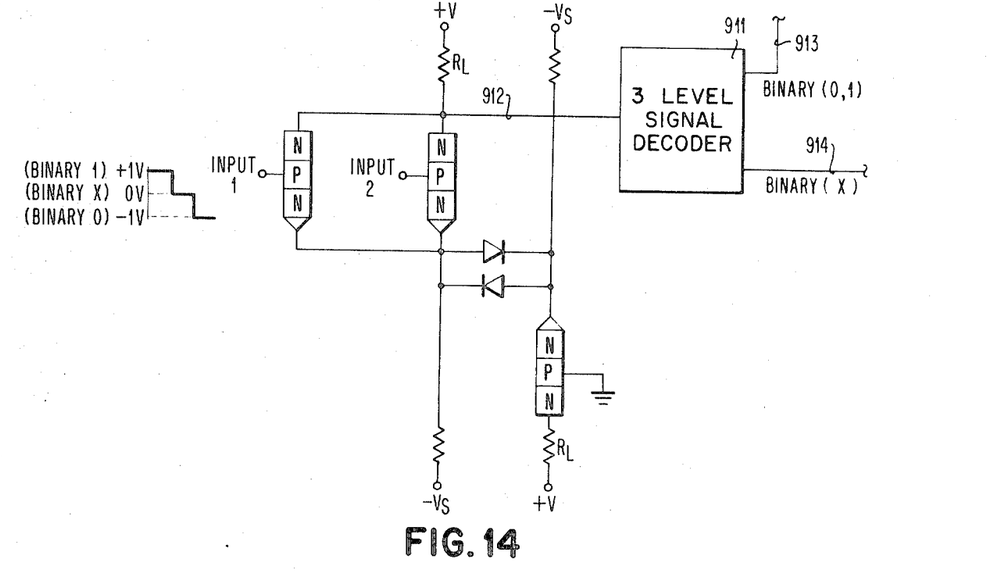
FIG. 14 is a circuit diagram of a three level NOR gate which may be used for each of the four NOR gates in the three level simulation of FIG. 3.

The three-level simulated reference 404 may be represented by three level NOR gates as shown in FIG 3. These NOR gates must be capable of accepting three level signal inputs and producing three level signal outputs. If the NOR gates are implemented by the circuitry shown in FIG. 14, the inputs and outputs of the NOR gate will be in accordance with the truth table in FIG. 13. Applications of the level shown in the truth table to the first and second inputs will produce the outputs indicated in the truth table. The circuit shown in FIG. 14 is a modification of the three level asynchronous switching circuit described in U.S. Pat. No. 3,156,830, in which instead of a single input, there is a pair of parallel inputs. The operation of the circuit is in accordance with the principles described in said patent.

When using the three signal level reference system shown in 14 and 15, the conversion back to two-level signals and the "inhibit compare" function may be accomplished by any standard three-level signal decoders as shown in FIG. 14. Decoder 911 is capable of discriminating between the three signal levels in output 912 and provides a signal representative of a binary 1 or 0 on line 913 and a signal representative of indeterminate binary level on line 914. Line 913 is connected to input line 803 in the compare circuit of FIG. 10 and line 914 is connected to OR-gate 802 in said circuit representing the input from "Inhibit Compare." Accordingly, a signal or the absence of a signal on line 913 will function as a binary 1 or 0 and a signal on line 914 will perform the "Inhibit Compare" function with respect to the compare circuit of FIG. 10.

In accordance with another aspect of the present invention, there is provided a method by which sequential test pattern, random, pseudorandom, or otherwise may be rapidly synchronized with respect to the circuit being tested in the reference simulation. Also, the logic levels in both the circuit and the simulation are synchronized by this method. In comparative testing, particularly with random or pseudorandom patterns, it is frequently necessary to apply several hundred pattern increments to the circuit and the reference before synchronization of the test pattern and the logic levels of the circuit is achieved. Initiating a test, it is necessary to achieve such synchronization before the actual testing can begin. The present method permits synchronization to be readily achieved during the initiation of a test pattern. With reference to FIG. 5, first the set input applies 48 0's or 48 1's to the 48 stages in the register of the random number generator. Next, the reset input changes the 48 0's to 1's or vice versa. In response to this change in all stages between the resulting first and second pattern increments, all 48 units in the three-level simulated reference are passed through the indeterminate or X level. We have found that this procedure involving the simultaneous excursion of all simulated reference units through the X level provides the necessary synchronization of reference and circuit being tested, as well as the logic levels in each. Thus, after only two initiating pattern increments, the testing may proceed.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Apparatus for testing nonlinear circuits having $n$-level logic comprising:
   means for generating an $n$-level electrical signal test pattern, each level being equivalent to one of said logic levels;
   means for applying said test pattern to at least one input in the circuit being tested;
   means for converting said test pattern to an $(n+1)$-level signal pattern in which $n$ levels represent the $n$ levels in the circuit logic and one level represents an indeterminate level in said circuit logic;
   a reference simulation of the circuit being tested adapted to receive said $(n+1)$ signal pattern at least one input corresponding to said at least one input in the circuit being tested and to provide a resulting $(n+1)$-level output;
   means for applying said $(n+1)$ signal pattern to said reference simulation;
   means for sensing the one level in the simulation output representing an indeterminate level in said circuit logic;
   means for converting the simulation output back to an $n$-level signal pattern;
   means for comparing the $n$-level output from the circuit being tested with the corresponding $n$-level converted output from the reference simulation;
   means for applying said output from the circuit being tested to said comparing means; and means for applying said corresponding converted reference simulation output to said comparing means.

2. The apparatus of claim 1, further including means responsive to said sensing means for inhibiting a comparison by said comparing means of that portion of said reference simulation output sensed at the one level representing an indeterminate level in said circuit logic.

3. In apparatus for testing nonlinear binary circuits comprising means for applying a bilevel electrical signal pattern to a plurality of input points in the circuit being tested, each level being equivalent to one of the binary circuit states and means for applying said signal pattern to a plurality of corresponding inputs in a reference simulation of said circuit, and means for comparing corresponding resulting outputs from said circuit and said reference simulation, the improvement comprising:

means for converting the bilevel signal pattern to a three-level pattern which has first and second levels representative of the two levels in the bilevel signal pattern and a third level representative of an indeterminate binary circuit state;

a reference simulation of said circuit adapted to receive said three-level signal pattern at inputs corresponding to the input points in the circuit being tested and to provide a resulting three-level output;

means for applying the three-level signal pattern to said reference simulation at said inputs;

means for sensing said third level in the simulation output; and means for converting the simulation output back to a bilevel signal pattern and for applying said converted pattern to said comparing means.

4. The apparatus of claim 3, further including means responsive to said sensing means for inhibiting a comparison by said comparing means of that portion of the reference simulation output sensed at the third level.

5. In apparatus for testing nonlinear binary circuits comprising means for applying a bilevel electrical signal pattern to a plurality of input points in the circuit being tested, each level being equivalent to one of the binary circuit states and means for applying said signal pattern to a plurality of corresponding inputs in a reference simulation of said circuit, and means for comparing corresponding resulting outputs from said circuit and said reference simulation, the improvement comprising:

means for converting the bilevel signal pattern to a three-level pattern which has first and second levels representative of the two levels in the bilevel signal pattern and a third level representative of an indeterminate binary circuit state;

a reference simulation of said circuit adapted to receive said three-level signal pattern at inputs corresponding to the input points in the circuit being tested and to provide a resulting three-level output;

means for applying said three-level signal pattern to said reference simulation including means permitting the application of a third level signal during a change between said first and second level signals being applied to a simulation input;

means for sensing said third level in the simulation output; and means for converting the simulation output back to a bilevel signal pattern and for applying said converted pattern to said comparing means.

6. In apparatus for testing nonlinear binary circuits comprising means for applying a bilevel electrical signal pattern to a plurality of input points in the circuit being tested, each level being equivalent to one of the binary circuit states and means for applying said signal pattern to a plurality of corresponding inputs in a reference simulation of said circuit, and means for comparing corresponding resulting outputs from said circuit and said reference simulation, the improvement comprising:

means for converting the bilevel signal pattern to a three-level pattern which has first and second levels representative of the two levels in the bilevel signal pattern and a third level representative of an indeterminate binary circuit state;

a reference simulation of said circuit adapted to receive said three-level signal pattern at inputs corresponding to the input points in the circuit being tested and to provide a resulting three-level output;

means for applying said three-level signal pattern to said reference simulation including means permitting the application of a third level signal during a change between said first and second level signals being applied to a simulation input;

means for converting said first and second levels in said three-level output back to the equivalent levels in said bilevel signal pattern and for applying the converted pattern to said comparing means; and means for inhibiting a comparison by said comparing means of that portion of said three-level output remaining at the third level.

7. The apparatus of claim 1 wherein:

said means for converting the test pattern converts said pattern into an ($n+1$)-level signal pattern formed in double-rail binary logic; and said reference simulation of the circuit being tested is formed in double-rail binary logic.

8. The apparatus of claim 7, further including means responsive to said sensing means for inhibiting a comparison by said comparing means of that portion of said reference simulation output sensed at the one level representing an indeterminate level in said circuit logic.

9. The apparatus of claim 3 wherein:

said means for converting the bilevel signal pattern converts said pattern to a three-level signal pattern formed in double-rail binary logic; and said reference simulation of the circuit is formed in double-rail binary logic.

10. The apparatus of claim 9, further including means responsive to said sensing means for inhibiting a comparison by said comparing means of that portion of the reference simulation output sensed at the third level.

11. In apparatus for testing nonlinear binary circuits comprising means for applying a bilevel electrical signal pattern to a plurality of input points in the circuit being tested, each level being equivalent to one of the binary circuit states and means for applying said signal pattern to a plurality of corresponding inputs in a reference simulation of said circuit, and means for comparing corresponding resulting outputs from said circuit and said reference simulation, the improvement comprising:

means for converting the bilevel signal pattern to a three-level signal pattern formed in double-rail binary logic, said three-level signal pattern having first and second levels representative of the two levels in the bilevel signal pattern and a third level representative of an indeterminate circuit state;

a reference simulation of said circuit formed in double-rail binary logic adapted to receive said three-level signal pattern at inputs corresponding to the input points in the circuit being tested and to provide a resulting three-level output;

means for applying said three-level signal pattern to said reference simulation including means permitting the application of a third level signal during a change between said first and second level signals being applied to a simulation input;

means for sensing said third level in the simulation output; and means for converting the simulation output back to a bilevel signal pattern and for applying said converted pattern to said comparing means.

12. The apparatus of claim 11, further including means responsive to said sensing means for inhibiting a comparison by said comparing means of that portion of the reference simulation output sensed at the third level.

13. In apparatus for testing nonlinear binary circuits comprising means for applying a bilevel electrical signal pattern to a plurality of input points in the circuit being tested, each level being equivalent to one of the binary circuit states and means for applying said signal pattern to a plurality of corresponding inputs in a reference simulation of said circuit, and means for comparing corresponding resulting outputs from said circuit and said reference simulation, the improvement comprising:

means for converting the bilevel signal to a three-level signal pattern formed in four-level double-rail binary logic, said three-level signal pattern having first and second levels representative of the two levels in the bilevel signal pattern and a third level representative of an indeterminate circuit state, the fourth level in said double-rail logic being representative of an error condition;

a reference simulation of said circuit formed in double-rail binary logic adapted to receive said three-level signal pattern at inputs corresponding to the input points in the circuit being tested and to provide a resulting three-level output;

means for applying said three-level signal pattern to said reference simulation including means permitting the application of a third level signal during a change between said first and second level signals being applied to a simulation input, means for sensing said third level in the simulation output;

means for sensing said fourth level in the simulation output indicative of an error condition; and means for converting the simulation output back to a bilevel signal pattern and for applying said converted pattern to said comparing means.

14. The apparatus of claim 1 wherein said means for generating a test pattern generate a random test pattern.

15. The apparatus of claim 3 wherein said bilevel electrical signal pattern is a random pattern.

16. The apparatus of claim 4 wherein said bilevel electrical signal pattern is a random pattern.

17. The apparatus of claim 6 wherein said bilevel electrical signal pattern is a random pattern.

18. The apparatus of claim 7 wherein said bilevel electrical signal pattern is a random pattern.

19. The apparatus of claim 18 further including means responsive to said sensing means for inhibiting a comparison by said comparing means of that portion of said reference simulation output sensed at the one level representing an indeterminate level in said circuit logic.

20. The apparatus of claim 9 wherein said bilevel electrical signal pattern is a random pattern.

21. The apparatus of claim 12 wherein said bilevel electrical signal pattern is a random pattern.

22. In a method for testing nonlinear circuits having $n$-level logic comprising applying an $n$-level electrical signal pattern to at least one input in the circuit being tested, each level being equivalent to one of said logic levels and applying said signal pattern to at least one corresponding input in a reference simulation of said circuit, and comparing corresponding resulting outputs from said circuits and said reference simulation, the improvement of determining whether a changing $n$-level signal pattern produces race conditions in sequential circuits being tested critical to at least a portion of the resulting outputs by a method comprising:

converting the $n$-level signal pattern to an $(n+1)$-level signal pattern, in which $n$ levels represent the $n$ levels in the circuit logic and one level represents an indeterminate level in said circuit logic;

applying said $(n+1)$ signal pattern to a reference simulation of said circuit adapted to receive said $(n+1)$ signal pattern at least one input corresponding to said at least one input in the circuit being tested and to provide a resulting $(n+1)$ level output, the sequence of application of said $(n+1)$ signal pattern to said reference simulation being such that when a given said simulation input is being changed from a first to a second of said $n$ logic levels, said one level representing the indeterminate logic level is applied to said given input before the second logic level; and determining whether said indeterminate logic level exists in at least a portion of said resulting simulation output after said change is completed, the existence of said indeterminate level indicating that the change produced race conditions critical to that portion of the output at the indeterminate level.

23. The method of claim 22 including the further steps of:

converting the simulation output back to an $n$-level signal pattern; and inhibiting the comparison of that portion of the simulation output remaining at the indeterminate level with the output of the circuit being tested.

24. In a method for testing nonlinear binary circuits comprising applying a bilevel electrical signal pattern to a plurality of input points in the circuit being tested, each level being equivalent to one of said binary circuit states, and applying said signal pattern to a plurality of corresponding inputs in a reference simulation of said circuit, and comparing corresponding resulting outputs from said circuits and said reference simulation, the improvement of determining whether a changing bilevel signal pattern produces race conditions in sequential circuits being tested critical to at least a portion of the resulting outputs by a method comprising:

converting the bilevel signal pattern to a three-level signal pattern, in which the first and second levels represent the two levels in the circuit logic and the third level represents an indeterminate binary circuit state;

applying said three-level signal pattern to a reference simulation of said circuit adapted to receive said three-level signal pattern at a plurality of inputs corresponding to said plurality of inputs in the circuit being tested and to provide a resulting three-level output, the sequence of application of said three-level signal pattern to said reference simulation being such that when a given one of said plurality of inputs is being changed from one of said first and second logic levels to the other, said third level is applied to said input being changed before the other changed level is applied; and determining whether said third logic level exists in at least a portion of said resulting simulation output after said change is completed, the existence of said third level indicating the change produced race conditions critical to that portion of the output at the third level.

25. The method of claim 24 including the further steps of converting the simulation output back to the bilevel signal pattern; and inhibiting the comparison of that portion of the simulation output remaining at the third level with the output of the circuit being tested.

26. The method of claim 24 wherein the three-level signal pattern is formed in double-rail logic.

27. The method of claim 25 wherein the three-level signal pattern is formed in double-rail logic.

28. The method of claim 22 wherein said applied $n$-level electrical signal pattern is randomly generated.

29. The method of claim 23 wherein said applied $n$-level electrical signal pattern is randomly generated.

30. The method of claim 24 wherein said applied bilevel electrical signal pattern is randomly generated.

31. The method of claim 25 wherein said applied bilevel electrical signal pattern is randomly generated.

32. The method of claim 26 wherein said applied bilevel electrical signal pattern is randomly generated.

33. The method of claim 27 wherein said applied bilevel electrical signal pattern is randomly generated.

34. In a method for testing nonlinear circuits having $n$-level logic comprising applying a changing $n$-level electrical signal pattern to a plurality of inputs in the circuit being tested, each level being equivalent to one of said logic levels, and synchronously applying said signal pattern respectively to a plurality of corresponding inputs in a reference simulation of said circuit, and comparing corresponding resulting outputs from said circuits and said reference simulation, the improvement of synchronizing the pattern applied to the circuit with the pattern applied to simulation and synchronizing the logic levels in said circuit with the logic levels in said simulation by a method comprising:

applying to said plurality of inputs in the circuit being tested, an $n$-level signal synchronization pattern made up of an initial pattern increment comprising a plurality of signals, each of which is respectively applied to one of said plurality of inputs followed by a next subsequent pattern increment in which each of the signals is at a changed logic level from the coincident signal in the initial pattern;

converting the $n$-level synchronization pattern to an $(n+1)$-level synchronization pattern, in which $n$ levels represent the $n$ levels in the circuit logic and one level represents an indeterminate level in said circuit logic; and applying said $(n+1)$ synchronization pattern to a reference simulation of said circuit adapted to receive said $(n+1)$ synchronization pattern at a plurality of inputs corresponding to said inputs in the circuit being tested and to provide a resulting $(n+1)$-level output, the sequence of application of said $(n+1)$ synchronization pattern to said reference simulation being such that when a given simulation input signal is being changed from a first to a second of said $n$ logic levels, said one level signal representing the indeterminate logic level is applied to said given input before the second logic level, whereby all of the simulation inputs have an indeterminate level signal applied thereto between the initial pattern increment and the next subsequent pattern increment.

35. The method of claim 34 wherein the $(n+1)$-level synchronization pattern is formed in double-rail logic.

36. The method of claim 35 wherein a randomly generated $n$-level electrical signal testing pattern is applied after the synchronization.

37. In a method for testing nonlinear binary circuits comprising applying a bilevel electrical signal pattern to a plurality of input points in the circuit being tested, each level being equivalent to one of said binary circuit states, and applying said signal pattern to a plurality of corresponding inputs in a reference simulation of said circuit, and comparing corresponding resulting outputs from said circuits and said reference simulation, the improvement of synchronizing the pattern applied to the circuit with the pattern applied to the simulation and synchronizing the logic levels in said circuit with the logic levels in said simulation by a method comprising:

applying to said plurality of input points in the circuit being tested, a bilevel signal synchronization pattern made up of an initial pattern increment comprising a plurality of signals, each of which is respectively applied to one of said plurality of input points followed by a next subsequent pattern increment in which each of the signals is at a changed logic level from the coincident signal in the initial pattern;

converting the bilevel signal pattern to a three-level signal pattern, in which the first and second levels represent the two levels in the circuit logic and the third level represents an indeterminate binary circuit state;

applying said three-level signal pattern to a reference simulation of said circuit adapted to receive said three-level signal pattern at a plurality of inputs corresponding to said plurality of inputs in the circuit being tested and to provide a resulting three-level output, the sequence of application of said three-level signal pattern to said reference simulation being such that when a given one of said plurality of inputs is being changed from one of said first and second logic levels to the other, said third level is applied to said input being changed before the other changed level is applied, whereby all of the simulation input points have an indeterminate level signal applied thereto between the initial pattern increment and the next subsequent pattern increment.

38. The method of claim 37 wherein the three-level signal pattern is formed in double rail logic.

39. The method of claim 37 wherein a randomly generated bilevel electrical signal testing pattern is applied after the synchronization.

40. The method of claim 37 wherein subsequent to synchronization, the testing of the circuit includes:

applying a randomly generated bilevel test pattern to said plurality of input points in the circuit being tested;

converting said bilevel test pattern to said three-level signal pattern;

applying said three level test pattern to said reference simulation at said corresponding plurality of inputs in accordance with the aforementioned sequence of application; and determining whether said third logic level exists in at least a portion of said simulation output after a change in the test pattern is completed, the existence of said third level indicating the change produced race conditions critical to that portion of the output at the third level.

41. The method of claim 40 including the further steps of converting the simulation output resulting from a three-level test pattern back to the bilevel signal pattern; and inhibiting the comparison of that portion of the simulation output remaining at the third level with the output of the circuit being tested.

* * * * *